United States Patent Office 3,283,418
Patented Nov. 8, 1966

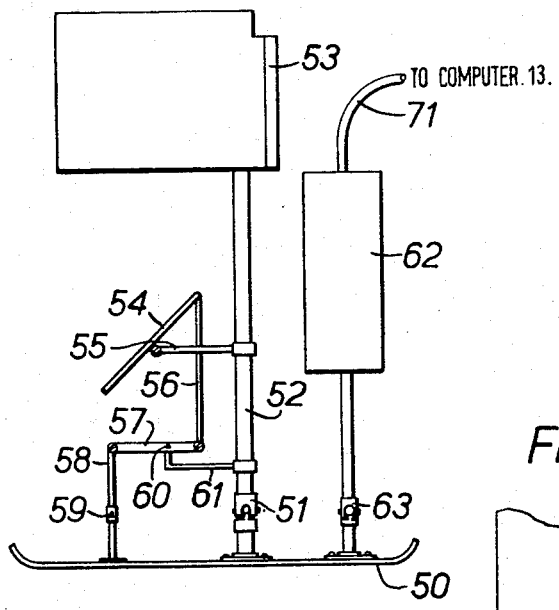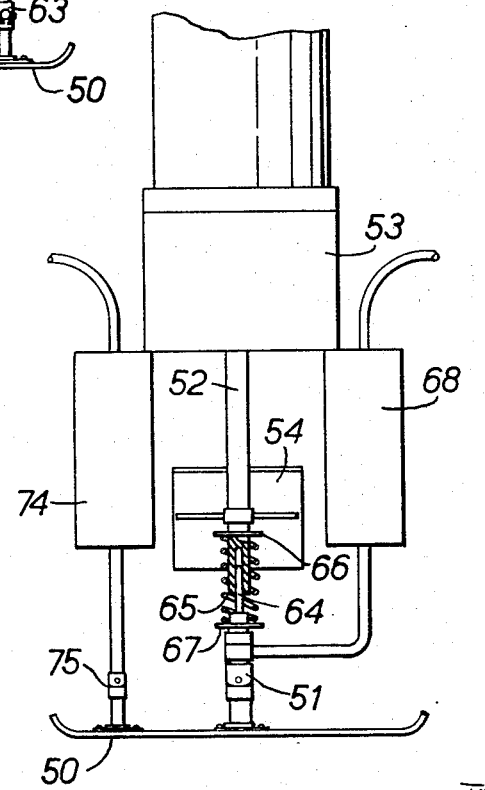

3,283,418
VEHICLE TRAINERS
Thomas Howard Brewer, Findon, Worthing, Sussex, and William Hilton, Ascot, England, assignors to Miles Electronics Limited, Sussex, England, a company of Great Britain
Filed Mar. 23, 1964, Ser. No. 353,981
9 Claims. (Cl. 35—11)

This invention relates to trainers for example, for training personnel in the handling of vehicles or military vehicles such as tanks.

Many simulators used for training personnel in the handling of vehicles require that a moving picture be presented. There are several systems for producing such moving pictures, the shadow graph being perhaps the simplest. This consists of a translucent model mounted on a moving platform in front of a point source of light. The light passing through the model forms an image on a screen which is situated in front of the driver. The position and movement of the model is dictated by a computed function of a driver's control movements and, therefore, the picture moves in accordance with the driver's actions.

The picture from such a system is lacking in detail and objects cannot be seen beyond a certain limited distance. For a given size of model a compromise must be made between route length and definition of detail.

A rather more sophisticated system of visual presentation utilizes film. In this system a film is taken from the driving position of a vehicle while it is being driven over a predetermined course. The vehicle must either travel at a constant speed or the actual speed must be recorded on the film in order to provide a datum for computation of the projector speed.

The film so obtained is projected on to a screen in front of the driver. The direction and speed of the projector is varied in accordance with the computed speed, as dictated by the trainee's controls and the conditions prevailing when the film was taken.

This system has certain disadvantages. For instance, only small steering errors may be made by the trainee before the projected display fails to give a true picture and also the original film must be made at a high frame speed to prevent flicker when the trainee is driving at a slower speed than the picture taking vehicle. The use of a high frame speed results in a large film footage per unit time and this will reduce the effective exercise time available.

In order to overcome some of the more serious disadvantages of the aforementioned systems we provide a vehicle trainer comprising a plurality of transducers for producing signals in response to the movement of control members for controlling the speed and direction of a simulated vehicle, a computer for generating positional output control signals in response to the signals produced by said transducers, a camera, and associated therewith an optical system to guide an image to the camera and positional control apparatus responsive to the output signals from said computer to produce relative movement between the optical system and an object from which said image is derived.

The object from which the image is derived is a scale relief model of the terrain over which for example a tank is driven by a trainee driver. The camera is a television camera connected in closed circuit with a monitor on which the image is presented to a trainee driver operating said control members and a further monitor may be provided for an instructor.

In ground vehicle training applications the camera and the optical system are movably mounted on a gantry above a scale relief model of a course over which the simulated vehicle is to be driven by the trainee driver. In one preferred embodiment of the invention the optical system may include a fibre optic tube supported between the camera and a shoe which is adapted to ride over the contours of the model. A mirror is mounted on the shoe to reflect an image of that part of the model immediately in front of one end of the tube. The gantry is movable over, and the camera across the model. Thus the transducers connected to the steering control member of the simulated vehicle generates signals which the computer processes into co-ordinate signals to move the camera and gantry across and along the model in a course set by the trainee.

In order that the invention may be fully understood a preferred embodiment of a simulator will now be described with reference to the accompanying drawings in which:

FIGURE 5 shows in detail part of the optical system of FIGURE 4, and

FIGURE 6 shows the rear view of that part of the optical system shown in FIGURE 5.

Figure 1:
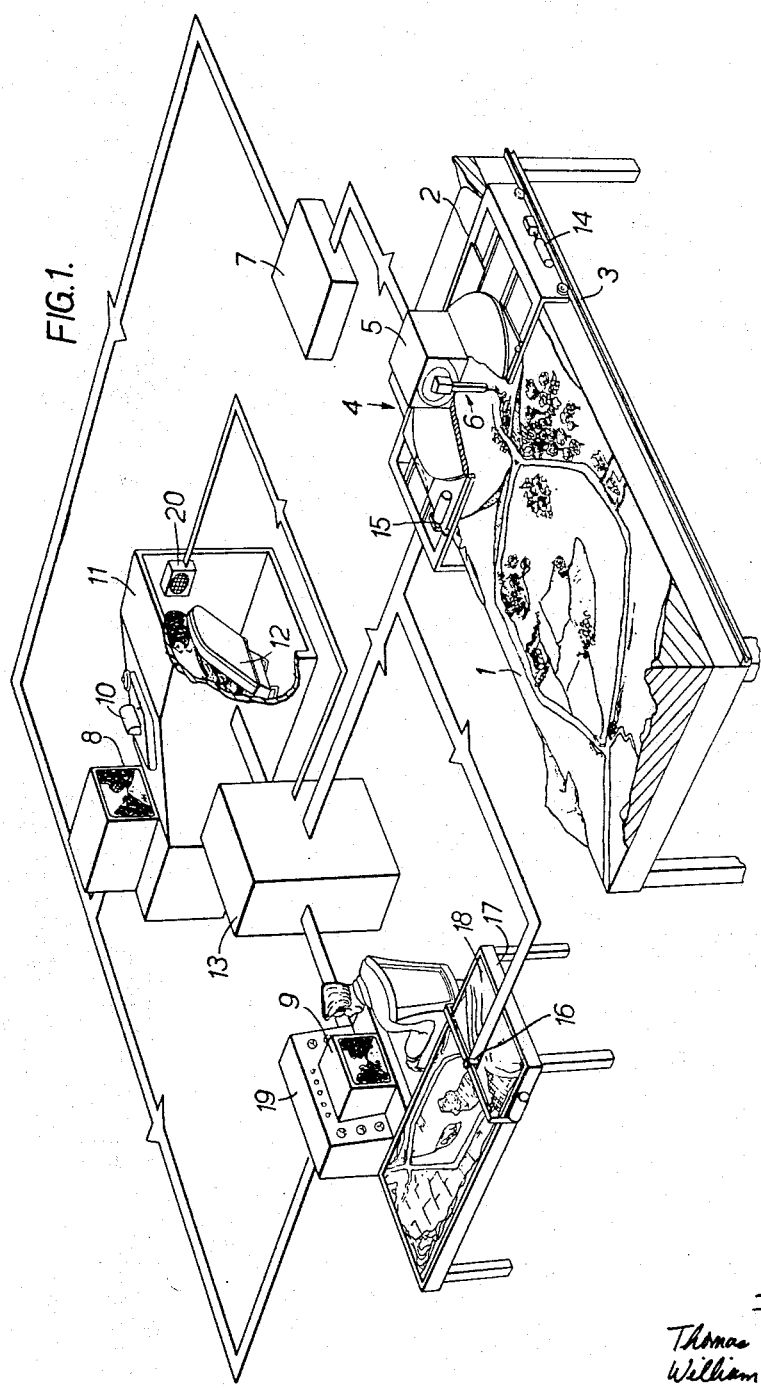
FIGURE 1 shows pictorially a tank trainer according to a preferred embodiment of the present invention.
Figure 3:
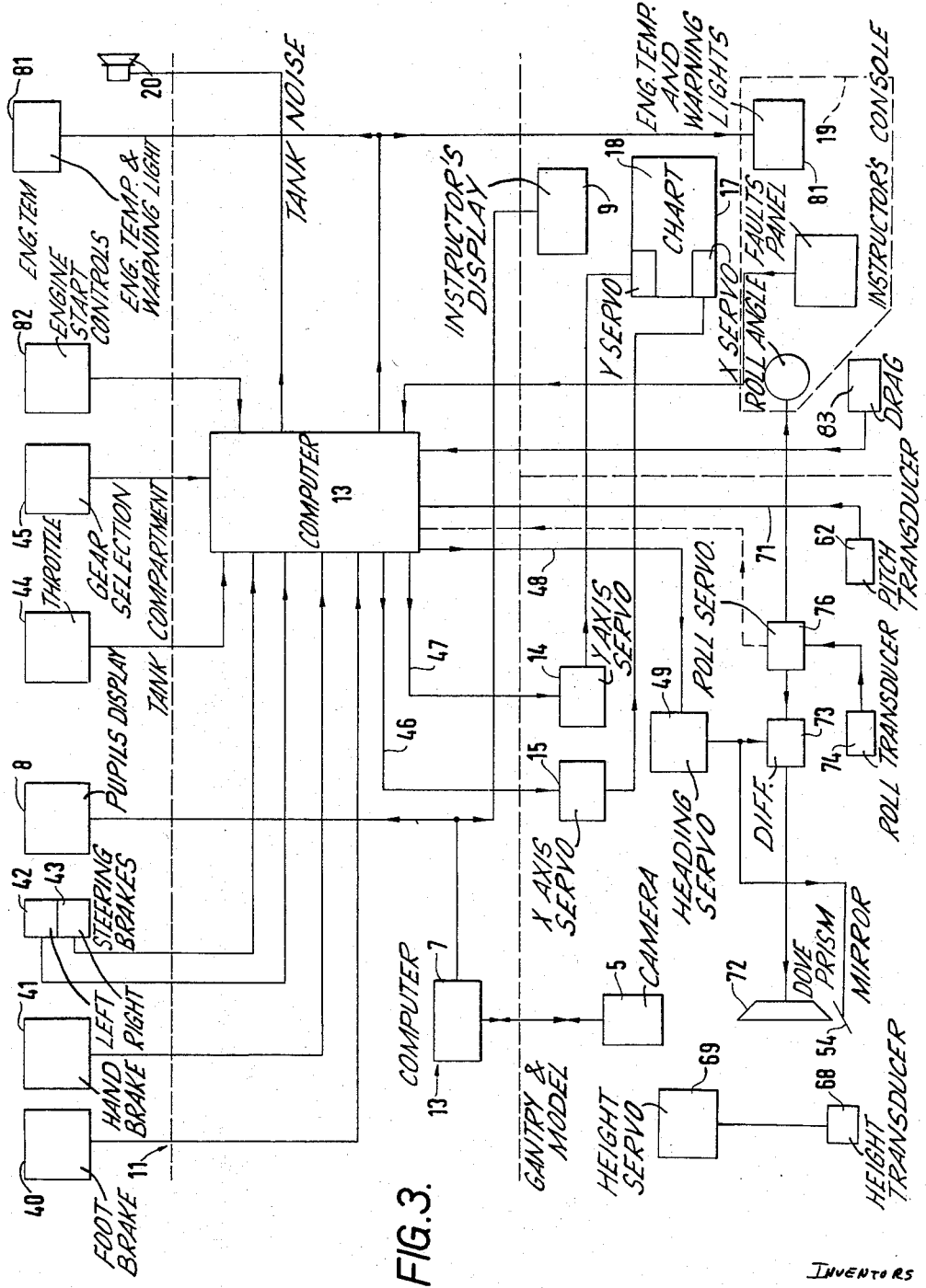
FIGURE 3 is a flow diagram of the tank trainer shown in FIGURE 1.

The trainer shown in FIGURES 1 and 3 includes a scale relief model 1 over which a gantry 2 is movable along guide rails 3 in a direction parallel to an axis, hereinafter referred to as the X axis, which is assumed to be in the centre of the model longitudinally thereof. A television camera 5 and an optical system 6 is mounted on the gantry 2 for movement in a direction parallel to an axis at right angles to the X axis and hereinafter referred to as the Y axis. A video control unit 7 for the camera 5 is connected to monitors 8 and 9. Each monitor includes a cathode ray tube on which is displayed the image received by camera 5. Monitor 8 is situated in front of the upper viewing window of a periscope 10 projecting from the top of a cubicle 11 representing the driving compartment of a tank. A seat 12 is provided for a trainee driver and the lower viewing window of the periscope 10 is positioned in front of the driver's eyes so that he is presented with the image displayed by the monitor 8. The cubicle 11 includes control members normally associated with a tank for controlling engine temperature gauges and warning lights.

The control members include, foot and hand brakes 40 and 41 respectively, left and right steering brakes 42 and 43, a throttle control 44 and a gear selection control 45. Each member has associated therewith a transducer for converting mechanical movements into signals, the signals from each member are fed to a computer 13 which provides output signals for controlling the movements of the gantry 2 and camera 5.

The control members are either spring loaded or coupled to a hydraulic system to provide the required degree of reaction on the corresponding member which would be experienced by a driver operating the control members of a real as opposed to a simulated vehicle.

All the control members with the exception of the gear selection 45 provide electrical signals proportional to the movement of the corresponding member. These signals are produced by potentiometers whose sliders are connected to the corresponding control member. The gear selection member 45 is a six position switch providing four forward and two reverse gears, the gear ratios being simulated by the computer 13.

The computer 13 supplies output positional control signals 46, 47 and 48 derived from the transducer output signals to positional control apparatus. Signals representing ground conditions such as ice, snow, mud or sand may be provided by a drag source 83 and fed to the computer 13 to modify the velocity signals provided thereby. The positional control apparatus includes a servo motor 14 to drive the gantry 2 along the guide rails 3, a servo motor 15 to drive the camera 5 across the gantry 2 and a servo motor 49 to orientate the optical system in the direction in which the simulated vehicle is being steered.

The movement of the gantry 2 relative to the model 1 and the movement of the camera 5 relative to the gantry 2 are both provided by drum and cable drives, one cable being attached to the gantry 2 and driven by servo motor 14 and the other cable being attached to a trolley on which the camera 5 is mounted and driven by servo motor 15. The trolley is provided with wheels which run on tracks secured to the upper portion of the gantry 2.

The output signals 46 and 47 fed from the computer to the servo motors 14 and 15 are also fed to an indicator 16 mounted above a chartboard 17 upon which is placed a contoured map 18 of the model 1. The monitor 9 is placed adjacent the chartboard 17. A control unit 19 placed behind the monitor 9 includes controls for overriding the movements of the control members in the cubicle 11 by an instructor and for indicating faults in the simulated vehicle for example by isolationg the electrical circuits to simulate an engine failure. The control unit 19 also includes engine temperature gauges and warning lights which receive signals from the computer which also simulates engine performance. These gauges and lights are duplicates of those installed in the cubicle 11.

A loudspeaker 20 mounted in the cubicle 11 is connected to noise generating circuits within the computer to simulate engine noises, changing gear and other sounds which are heard in the driving compartment of a tank. Noises generating circuits external to the computer may be used but control must be exercised by the computer since for example a depression of the accelerator control member to increase "engine" speed must be accompanied by a characteristic change in the noise generated by such external circuits. To consider now in detail how the movements of the gantry, camera and optical system are controlled, reference is made to FIGURES 2, 4, 5 and 6.

The tank is simulated by a shoe 50 mounted by a universal joint 51 to a rod 52 attached to a lower telescopic tube 53 of the optical system 6. Above the shoe 50 is a mirror 54 pivotally secured to a bracket 55 clamped to the rod 52. A linkage having members 56, 57 and 58 connect the shoe to the mirror so that pitching of the shoe when travelling over undulations in the model 1 causes tilting of the mirror, that is movement in the plane of the X axis about the Y axis. By means of a further universal joint 59 in the link 58, rolling of the shoe, that is movement in the plane of the Y axis about the X axis, is not transmitted to the mirror. The link 57 is pivoted at 60 by an arm 61 secured to rod 52 to give a 1:2 movement of the mirror relative to the shoe. Thus a pitch angle of any 10° will cause the image reflected from the mirror 54 to be tilted through half that angle. Electrical sensing of pitch is provided by a transducer 62 coupled to the shoe 50 by means of a universal joint 63.

In FIGURE 6 is will be seen that the mirror 54 is fixed relative to the optical system 6 but moves relative to the shoe 50 which has a rod 64 above the universal joint 51 slidable within a bore in the rod 52. A spring 65 mounted between a collar 66 secured to the rod 52 and a collar 67 mounted on the rod 64 urges the shoe downwards to maintain it in contact with the surface of the model 1. The mirror 54 is kept at the same height above the shoe corresponding to the height above the ground of the viewing position of a driver sitting in a real tank by means of a height servo system including a height transducer 68 mechanically connected to the rod 64 and electrically coupled to a height servo motor 69 which moves the lower telescopic tube 53 relative to an upper telescopic tube 70 of the optical system 6 when the shoe travels over the undulations of the model 1.

The output 71 of the pitch transducer 62 is fed to the computer 13 and together with the signals fed from the control members 40 to 45 provide the basic information from which the computer derives the X and Y signals 46 and 47 and heading signal 49. Since, as stated before, the computer simulates engine performance, then certain parameters of the engine itself and of the tank are either stored within the computer 13 and made continuously available or are fed in from simulation sources not shown.

From this input information the velocity of the tank and its heading is derived, the pitch information modifying the velocity signal in accordance with the inclinations and declinations of the model sensed by the shoe 50. The signals representing speed and course of the vehicle are resolved by the computer 13 into X and Y ordinates and a heading angle signal 49. The X and Y signals 46 and 47 energise the X and Y axis servo motors 15 and 14 respectively to move the gantry 2 and camera 5 to the position on the model 1 defined by these signals. The direction in which the simulated vehicle travels relative to the X and Y axes is defined by the heading angle signal 48 which drives the heading servo 49 mounted on the lower tube 53 of the optical system 6. The heading servo 49 is mechanically coupled to the mirror 54 to rotate the latter relative to the axis of the optical system, that is to say about an axis at right angles to both the X and Y axes.

Since rotation of the mirror 54 introduces an undesirable roll effect into the image transmitted by the camera 5, a dove prism 72 is rotatably mounted in the tube 63 and driven via a differential gear 73 by the heading servo motor 49 through an angle equal to half the heading angle but in the opposite direction to remove this undesirable roll effect.

Roll actually experienced by the shoe is sensed by a transducer 74 coupled to the shoe 50 by means of a universal joint 75 which obviates the effects of pitch. The transducer 74 provides signals which energise roll servo motor 76 coupled to the gear 73 to rotate the dove prism 72 through an angle equal to half the angle through which the shoe rolls.

In the case of a land vehicle with soft suspension, a signal may be derived from the computer which is proportional to the roll produced by centrifugal and gravitational forces. This signal is added to the signal produced by the roll transducer 74 to rotate the prism 53 accordingly. An indication of roll angle is provided on the instructor's console 19.

The prism 53 forms part of the complete optical system 6 which includes a collimating lens 77 positioned immediately above the mirror 54 and housed within the lower end of the tube 53, an image forming lens 78 mounted within the upper tube 70 and a further front surface silvered mirror 79 mounted within an elbow 80 connecting the tube 70 to the camera 5.

Thus it will be seen that images of the model 1 received by the mirror 54 are transmitted to the camera 5 and are corrected for heading, roll and pitch.

The camera 5 may be operated by a 405 or 625 line system, the latter giving slightly better definition.

Figure 2:
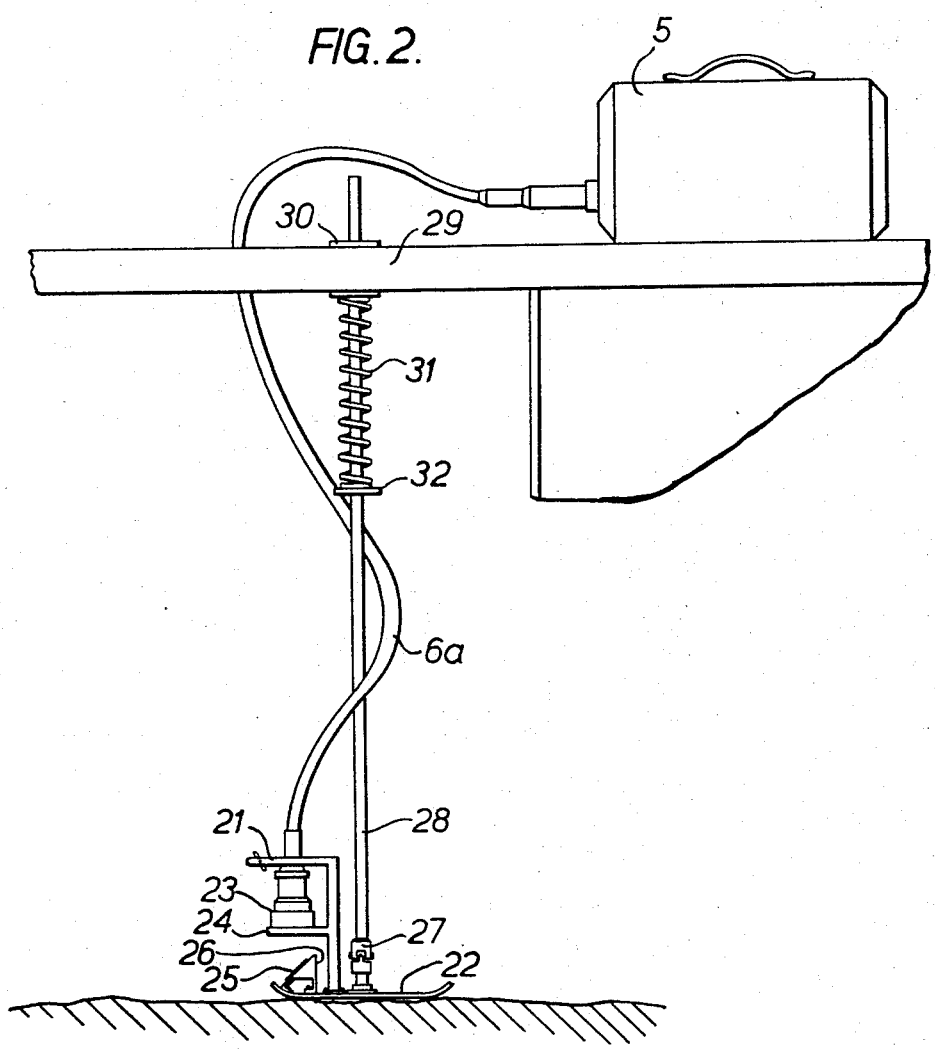
FIGURE 2 shows one form of optical system for the trainer of FIGURE 1.
Figure 4:
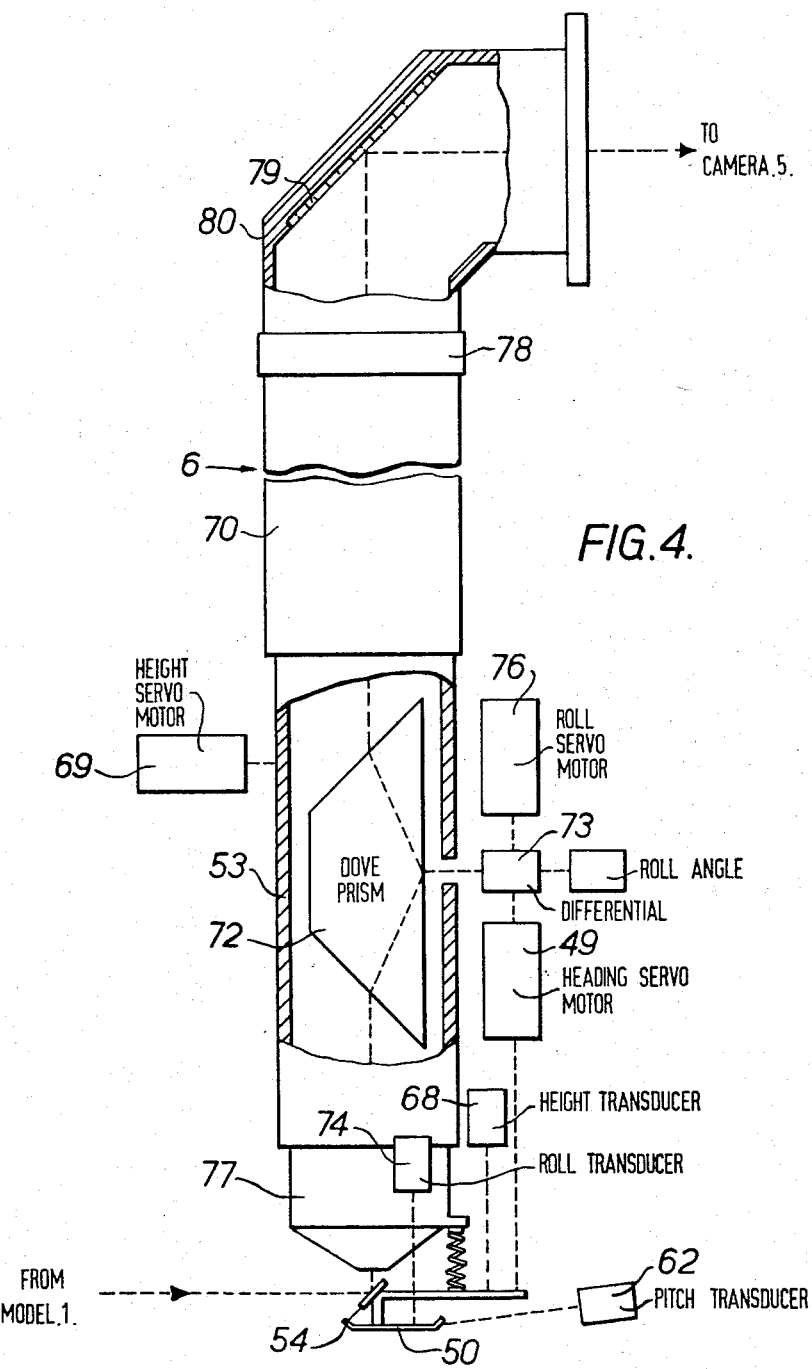
FIGURE 4 is a diagrammatic illustration of a preferred optical system for use with the trainer shown in FIGURE 1.

Instead of using the optical system 6 shown in FIGURES 4, 5 and 6, a "flexible" optical system as shown in FIGURE 2 may be used.

Referring now to FIGURE 2, a fibre optic tube 6a is connected at one end to the camera 5 and at the other end to a bracket 21 secured to a shoe 22 which is adapted to ride over the surface of the model 1. A lens 23 is connected to that end of the tube 6a adjacent the shoe and is supported in a retaining ring 24 connected to the bracket 21. Immediately beneath the lens 23 is a mirror 25 secured to a block 26 which is rigidly mounted on the shoe 22. That face of the block 26 to which the mirror is secured is at an angle of 45 degrees to the longitudinal axis of the shoe 22. The front and rear edges of the shoe are upturned to prevent it "digging in" to any sharp inclinations in the relief model. A universal joint 27 connects the shoe 22 to a shaft 28 which is slidably mounted in a frame member 29 of the gantry 2. Downward movement of the shaft 28 is limited by a collar 30 secured thereto above the frame member 29. The shoe 22 is kept in intimate contact with the surface of the model 1 by means of a helical spring 31 about the shaft 28 retained between the underside of the frame member 29 and a collar 32, secured to the shaft 28.

In operation of the simulator the trainee driver seated in the cubicle 11 operates the control members to guide the "tank" along a course dictated by the instructor. The shoe 50 or 22 simulates the tank and its movement is controlled by the positional control output signals from the computer 13 generated in response to the signals from the transducers associated with each control member and other signals hereinbefore referred to. The positional control signals drive the two servo motors 14 and 15 to move the gantry 2 and camera 5 to a position defined by the movement of the steering control member. The rate at which the camera and gantry move is dependent on the signals fed from the transducer associated with the control members located in the cubicle and with the gradients on the model sensed by the pitch transducer 62.

The indicator 16 driven by positional control apparatus similar to that associated with the camera and gantry moves in sympathy therewith to indicate on the map 18 the position on the model to which the trainee driver has driven the simulated tank. By operation of the controls provided in control unit 19, the instructor can correct mistakes made by the trainee by over-riding the control members in the cubicle, control unit 19 being equipped with similar control members and transducers to those contained within the cubicle 11.

The cubicle 11 and instructor's console 19 are also provided with a set of instruments 81 the same as those existing in an actual tank. These instruments, however, are modified to respond to electrical signals which are obtained from the computer 13. For example, the oil pressure gauges existing in an actual tank are coupled to the oil system whereas in the simulator oil pressure is represented by an electrical signal and in consequence the gauges are modified accordingly. Warning lights are also installed in the cubicle 11 to provide warning of faults occurring in the engine and these are also coupled to the computer 13 which provides all the necessary electrical signals to represent engine performance.

The trainee pupil has, therefore, before him all the controls and instruments of an actual tank and can "drive" the tank anywhere over the terrain provided by the model 1. The view the pupil sees from the lower mirror of the periscope is a realistic one, and sounds associated with a tank are provided by noise generating circuits as hereinbefore described. These noise generating circuits are also controlled by engine start controls 82 located within the cubicle 11.

The cubicle 11 may also be pitched and rolled in sympathy with the pitching and rolling of the shoe 50 by a hydraulic system operable under control of the pitch and roll transducers 62 and 74 respectively.

Pitch and roll may alternatively be simulated by providing on table 17 a model identical to the model 1 and mounting pitch and roll transducers on a shoe which is kept in contact with the surface of the model, the shoe being mounted directly beneath the indicator 16, the outputs of the pitch and roll transducers controlling mechanisms for sympathetic movement of the cubicle 11.

We claim:
1. A vehicle simulator for training personnel in the use of an actual vehicle over a training ground comprising a scale model of the training ground; a television camera; an optical system coupled to said camera to guide thereto images of said model corresponding to the view a trainee would have from an actual vehicle travelling over ground represented by said model; means mounting said optical system and camera over said model; a vehicle driving compartment; vehicle steering and speed control members mounted in said driving compartment; transducer means providing electrical output signals in response to movement of said control members to represent direction and speed; a computer operable to produce positional and velocity signals derived from the electrical output signals produced by said transducer means; means to position said mounting means relative to said model under control of the positional and velocity signals; means for sensing the contours of said model over the path steered by said optical system; means coupled to said sensing means to provide electrical signals representing the model contours; means coupling said last mentioned means to said computer to modify the velocity signals therefrom in accordance with the model contours, and means coupled to said camera to present the images as seen by said optical system to a trainee driver seated in said driving compartment.

2. A vehicle simulator as claimed in claim 1 including means coupled to said sensing means to provide electrical signals representative of the roll thereof occasioned by the contours of said model, said optical system including means to rotate the image guided by said optical system to said camera under control of the signals representing roll.

3. A vehicle simulator according to claim 1 in which said optical system includes a mirror for receiving said images and a bundle of flexible optical fibres optically coupling said mirror to said television camera.

4. A vehicle simulator according to claim 1 including an instructor's console comprising a map of the area provided by said model and to the same scale thereof, a pointer means for moving said pointer over said map in response to the positional and velocity signals provided by said computer, a monitor receiver coupled to said camera and means for modifying the signals produced by said computer to simulate vehicle faults.

5. A vehicle simulator according to claim 1 including means for modifying the velocity signals provided by said computer to simulate vehicle drag, due to ground conditions.

6. A vehicle simulator according to claim 1 including engine temperature gauges, fault condition indicators and a loudspeaker mounted in said driving compartment, a source for providing to said computer electrical signals representing engine performance for modification by the electrical output signals produced by said transducer means and fed to the computer and means for feeding these modified signals to the appropriate engine temperature gauges, fault condition indicators and loudspeaker.

7. A vehicle simulator for training personnel in the use of an actual vehicle over a training ground comprising a scale model of the training ground; a television camera; an optical system coupled to said camera to guide thereto images of said model corresponding to the view a trainee would have from an actual vehicle travelling over ground represented by said model; means mounting said optical system and camera over said model; a vehicle driving compartment; vehicle steering and speed control members mounted in said driving compartment; transducer means providing electrical output signals in response to movement of said control members to represent direction and speed; a computer operable to produce positional and velocity signals derived from the electrical output signals produced by said transducer means; means to position said mounting means relative to said model under control of the positional and velocity signals; means for sensing the contours of said model over the path steered by said optical system; means coupled to said sensing means to provide electrical signals representing the model contours; means coupling said last mentioned means to said computer to modify the velocity signals therefrom in accordance with the model contours, and means for rolling and pitching the driving compartment in response to the signals representing the model contours.

8. A vehicle simulator for training personnel in the use of an actual vehicle over a training ground comprising a scale model of the training ground, a television camera, an optical system coupled to said camera, said optical system including first and second mirrors forming a periscope and an image rotating prism mounted between said mirrors, said first mirror being mounted in relation to said model for receiving images thereof corresponding to the view the trainee would have from an actual vehicle travelling over ground represented by said model and reflecting said images through said image rotating prism to said second mirror which in turn reflects said images onto said camera, said simulator further including means mounting said camera and optical system over said model, a vehicle driving compartment, vehicle steering and speed control members mounted in said driving compartment, transducer means providing electrical output signals in response to movement of said control members to represent direction and speed, a computer operable to produce positional and velocity signals in response to the electrical output signals produced by said transducer means, means to position said mounting means relative to said model under control of the positional and velocity signals, means for sensing the contours of said model over the path steered by said optical system, means coupled to said sensing means to provide electrical signals representing the model contours, means coupling said last mentioned means to said computer which modifies the velocity signals therefrom in accordance with the model contours, means coupled to said sensing means to provide electrical signals representative of the roll thereof occasioned by the model contours and means to rotate said prism to rotate said images in accordance with the value of said electrical signals representing roll.

9. A vehicle simulator for training personnel in the use of an actual vehicle over a training ground comprising a scale model of said training ground, a television camera, an optical system coupled to said camera, a gantry, means mounting said camera and optical system on said gantry and over said model, a plurality of control members manually operable to simulate corresponding control members of an actual vehicle, a plurality of transducers coupled to said control members and operable thereby to produce signals representing speed and direction of the actual vehicle, a computer responsive to the signals produced by said transducers to provide positional and velocity signals, means for moving said mounting means relative to said gantry and said gantry relative to said model under control of said positional and velocity signals, a television receiver coupled to said camera to provide images to a trainee corresponding to the images of said model as seen by said optical system and means to maintain said optical system at a predetermined height above said model, said optical system including a mirror and a lens system for passing images of said model received by said mirror to said television camera and said height-maintaining means including a servo system coupled to said mirror for maintaining the latter at said predetermined height, corresponding to the eye level of a driver driving an actual vehicle over ground represented by said model.

References Cited by the Examiner
UNITED STATES PATENTS

| | | | |
|---|---|---|---|
| 2,579,177 | 12/1951 | Miles | 35—11 |
| 2,979,832 | 4/1961 | Klemperer | 35—12 |
| 3,125,812 | 3/1964 | Simpson | 35—3 |

EUGENE R. CAPOZIO, *Primary Examiner.*

R. E. KLEIN, *Assistant Examiner.*